Figure 1:
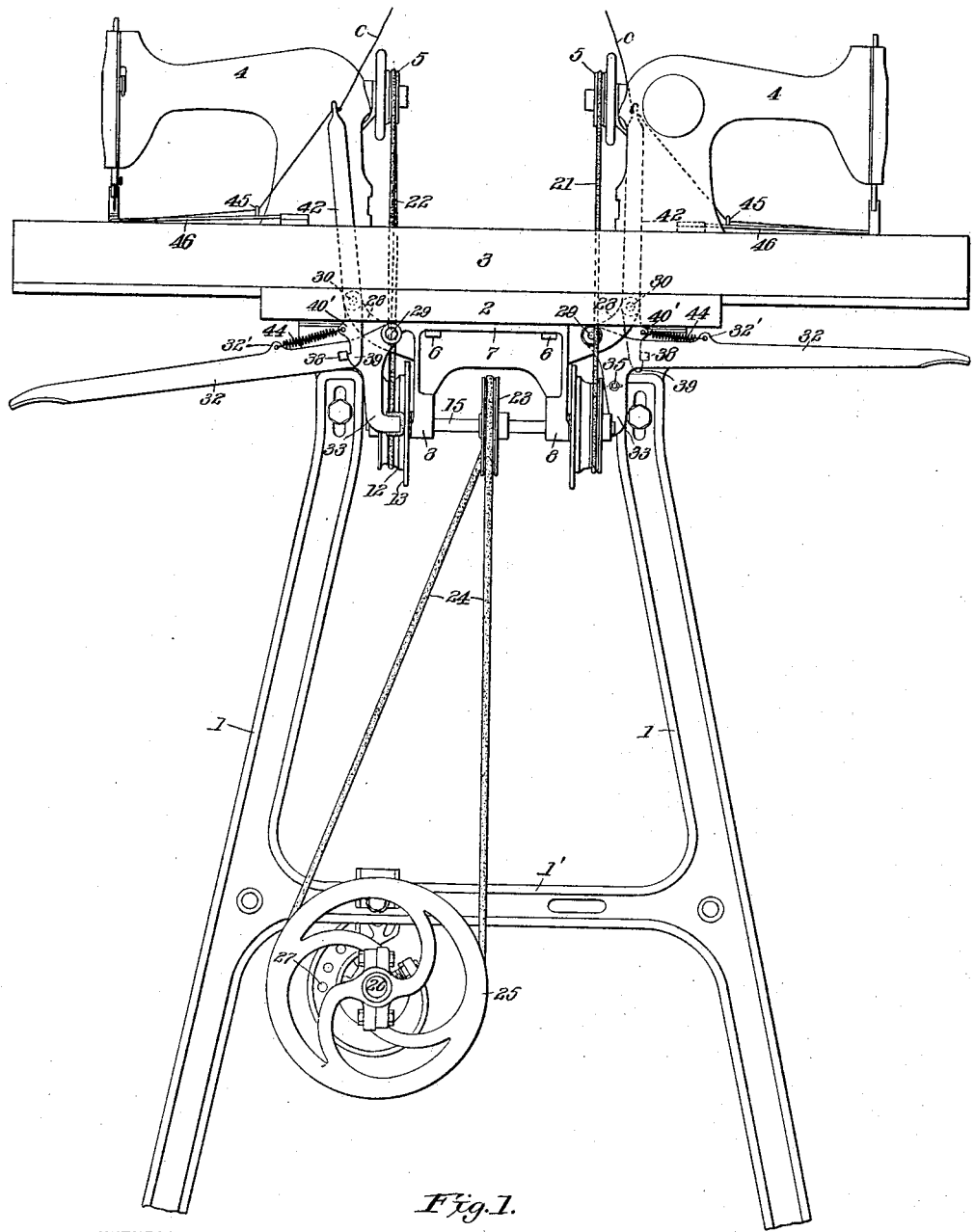

H. CORRALL.
DRIVING DEVICE FOR SEWING MACHINES.
APPLICATION FILED OCT. 19, 1912.

1,192,827.

Patented July 25, 1916.
2 SHEETS—SHEET 1.

WITNESSES:

INVENTOR

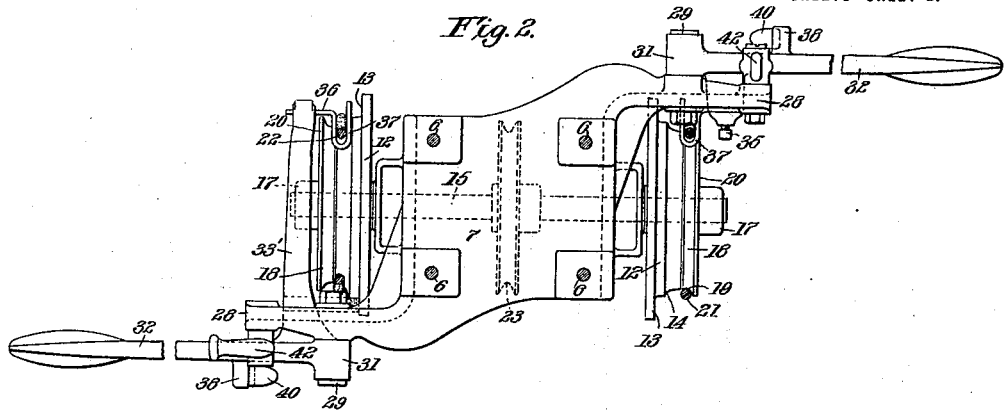

UNITED STATES PATENT OFFICE.

HERBERT CORRALL, OF PARKVIEW, HELENSBURGH, SCOTLAND, ASSIGNOR TO THE SINGER MANUFACTURING COMPANY, A CORPORATION OF NEW JERSEY.

DRIVING DEVICE FOR SEWING-MACHINES.

1,192,827.          Specification of Letters Patent.      Patented July 25, 1916.

Application filed October 19, 1912. Serial No. 726,757.

*To all whom it may concern:*

Be it known that I, HERBERT CORRALL, a subject of the King of the United Kingdom of Great Britain and Ireland, residing at Parkview, Helensburgh, Dumbartonshire, Scotland, have invented certain new and useful Improvements in Driving Devices for Sewing-Machines, of which the following is a specification, reference being had therein to the accompanying drawings.

This invention relates to driving gear for power driven sewing machines, such as corset-cording machines, which are arranged in gangs or rows upon a bench and driven by belts and pulleys from the under side of the bench, and it comprises devices for shipping the driving belt from a stationary idler pulley mounted on a bush or extension of the frame concentric with a continuously rotating shaft to a driving pulley fixed upon the latter, and trip gear for unshipping the belt to stop the machine when a knot or other obstruction presents itself in the length of the cord.

The under-driving gear comprises a rotating shaft carried in bearings of a hanger depending from the bench and having a central belt-pulley and at each end a fast and a loose belt-pulley carrying a belt, normally on the loose pulley and extending through the bench to a sewing machine thereon. The fast pulley and loose pulley are made each with a single flange on the outside and the loose idler or stationary pulley is of slightly larger diameter than the fast or driving pulley, its groove inclining or leading toward the driver so that the initial tension on the belt is sufficient to roll the belt sidewise on to the driver as soon as the counter-resistance of the belt-fork or shipper is removed.

The belt-fork is attached to a bell crank which also serves as a brake-lever, the long arm of the lever being adapted to be lifted to shift the belt onto the fast pulley to start the machine and to be held there by a pivoted latch or trip lever engaging a lug or projection affording a detent shoulder on the lever-arm. The trip-lever extends upwardly from its pivot and terminates in an aperture through which the cord used for cording corsets passes on its way to the sewing mechanism. Should a knot or excessively thick section of cord enter this eye its drag tilts the trip-lever against the resistance of a light spring and disengages the latch from the belt-shifter arm, which, falling by gravity, moves the belt-fork to transfer the driving belt from the fast to the loose pulley and apply the brake so that the sewing machine is stopped.

When the sewing machine is out of action, the initial pull of the sewing machine belt is entirely removed from the under-driving shaft, the loose pulley being mounted on a bush so that undue wear upon the shaft is obviated.

In the drawings, Figure 1 is an end elevation of a power bench or table having a driving device embodying the present improvement. Fig. 2 is a plan upon a larger scale, of the driving device. Fig. 3 is an end view and Fig. 4 a side view of the shipper-lever. Fig. 5 is an edge view and Fig. 6 a side view of the latch- or trip-lever. Fig. 7 is a partial sectional elevation, upon a still larger scale, of a portion of the hanger and the fast and loose pulleys sustained thereby.

The power bench or table is shown constructed with the end frames or standards 1 upon which is mounted for vertical adjustment the longitudinal platform 2 upon which may be secured at intervals the transverse table members 3 suitably spaced apart and each sustaining the sewing machine heads 4 with their main-shafts in substantial alinement and carrying the grooved belt-pulleys 5 at their adjacent ends.

Secured to the under side of the platform 2 by means of bolts 6 is the bracket 7 with depending spaced and alined bearing bosses 8 in which are secured the oppositely extending bushings 9 affording exterior journals 10 for the hubs 11 of the loose pulleys 12 each formed at the edge adjacent the boss 8 with the brake-flange 13 and provided adjacent the opposite edge with the conical belt-receiving portion or face 14.

Journaled within the bushings 9 is the driving shaft 15 to which is secured adjacent the pulley-hubs 11 by means of the set-screws 16 the hubs 17 of the fast-pulleys 18 provided with the belt-receiving portion or face 19 of substantially conical form or contracted in diameter from the edge adjacent the loose pulley 12 toward the opposite edge which is formed with the guard-flange 20. The operative faces of the fast and loose pulleys are substantially of the same size at their adjacent edges and together form a continuous substantially conical surface inclined outwardly from the boss 8 relative to their axis of rotation. Driving belts 21 and 22, represented herein of circular cross-section, embrace the pulley 5 of each sewing machine and either of the pulleys 12 and 18 for connection of the driving shaft 15 with the main-shafts of the sewing mechanisms, the belt 22 being crossed so as to turn its respective pulley 5 in a direction suitable for turning the sewing machine driving shaft in the proper direction to compensate for the reversed position of the sewing machine head relatively to the other machine.

The shaft 15 has fixed thereon intermediate the bosses 8 the grooved belt-wheel 23 over which runs the twisted belt 24 encircling the grooved belt-wheel 25 upon the power-shaft 26 sustained by suitable hangers 27 depending from cross members 1' of the standards 1 and driven by any usual or suitable means, such as an electric motor.

The bracket 7 is provided with divergently and upwardly extending arms 28 sustaining the fulcrum-pins 29 and 30. Upon each of the fulcrum-pins 29 is journaled at the junction of its arms the hub 31 of the angular shipper-lever constructed with a lateral actuating arm 32 and a shorter depending shipper and brake-shoe carrying arm 33 whose extremity has a facing 34 of leather or other suitable material to afford a brake-shoe adapted to engage the outer face of the flange 13 of the loose pulley. The right-hand shipper-lever is shown provided in its arm 33 with a socket in which is secured by means of the set-screw 35 the shank 36 of the shipper-fork 37, while the other shipper-lever has a lateral extension 33' similarly provided with a socket in which is secured the shank 36 of the other shipper-fork 37, so that both shipper-forks are arranged upon the same side of the shaft 15 while the body portions of such levers are arranged upon opposite sides of such shaft, as represented more particularly in Fig. 2.

The arm 32 of each shipper-lever is provided with a lateral lug or projection 38 affording a detent-shoulder adapted for engagement by the hooked extremity 39 of the depending arm 40 of a latch-lever having a hub 41 journaled upon one of the fulcrum-pins 30 and having an upwardly extending arm 42 flattened at its extremity and provided with a transverse cord-guiding aperture 43. Each latch-lever is normally drawn into operative engagement with the lug 38 by means of a spring 44 having one end secured to an apertured ear 40' of the depending arm 40 and the other similarly connected with an apertured ear 32' of the shipper-lever arm 32.

To set the machine in operation, the shipper-lever arm 32 is manually raised, as represented at the right in Fig. 1, whereby the brake-shoe 34 is disengaged from the brake-flange 13 and the belt 21 is shifted from the loose to the fast pulley, the parts being held in such position by engagement of the hooked extremity 39 of the latch-lever with the lug 38 under the action of the spring 44. In this position of the latch-lever, the cord c, led through the guide-aperture therein and a suitable guide-eye 45 of the corder 46 upon the sewing machine bed-plate to the material being stitched, is freely drawn by the action of the stitch-forming mechanism. Upon the approach of any abnormal enlargement in the cord such as might be produced by a kink or knot or an imperfection therein, liable to impair the free passage of the cord through the aperture 43, the resistance thus produced causes the latch-lever to be shifted sufficiently to disengage the member 39 from the lug 38, thereby causing the arm 32 to automatically descend by gravity, as represented at the left in Fig. 1, whereby the connecting belt 22 is shifted over upon the loose pulley and the brake-shoe forcibly thrust against the flange 13 to stop the machine for removal of the enlargement of the cord preparatory to the continued operation of the sewing machine. When it is desired to start the machine the arm 32 of the shipper-lever is manually lifted whereupon the spring 44 acts to insure the reëngagement of the latch-lever with the shipper-lever whereby the latter is retained in running position.

It will be observed that when the machine is running, with the driving belt upon the smaller of the pulleys fixed upon the driving shaft 15, the action of the shipper in throwing the belt upon the loose pulley is assisted by the centrifugal action of the belt, tending to cause it to creep up the inclined face of such larger pulley; while the actuation of the shipper-lever in the opposite direction to throw the belt upon the smaller driving pulley tends to roll the belt upon itself upon the conical face of the now stationary loose pulley and thereby aids the shipper in performing its function.

By the means just described, the pull of the driving belts upon the shaft 15 is produced only when the driven machines are actually in operation, and at other times, when the belts are under slightly greater tension upon the larger normally stationary pulleys, their cross-strain upon the driving shaft is wholly removed therefrom and is sustained by the stationary bushing 9 10 of each bearing boss 8.

It has been common heretofore to ship a continuously running belt from a loose pulley or idler to a fast pulley upon a shaft to be driven; but according to the present invention the connecting belt is stationary when the driven machine is not in operation, and the wear of the parts consequent upon the lateral pull of the belt is wholly removed, not only from the shaft but from the loose pulley which it embraces, when the driven machine is at rest.

Having thus set forth the nature of the invention, what I claim herein is:—

1. A driving device for sewing machines comprising a driving and an idler pulley mounted for independent rotation upon a common axis and having conical faces inclined in the same direction relative to said axis and of substantially equal diameter at their adjacent edges, a belt adapted to connect said pulleys with a machine to be driven, a shipper for shifting the belt from one to the other of said pulleys, a lever carrying said shipper and constructed and adapted to assume and remain in one extreme position for holding the belt upon the idler pulley, and a latch-lever for detaining the shipper-lever in its other extreme position and formed with an aperture to receive a cord leading to the stitching mechanism, said lever being adapted to be shifted by imperfections in the cord to release said shipper-lever for permitting the belt to be automatically shifted upon the idler pulley.

2. A driving device for sewing machines comprising a continuously running driving pulley and an adjacent normally stationary idler pulley mounted for independent rotation upon a common axis and having conical faces inclined in the same direction relative to said axis and of substantially equal diameter at their adjacent edges, a belt adapted to connect said pulleys with a machine to be driven, a shipper for shifting the belt from one to the other of said pulleys, a self-acting lever provided with a detent shoulder and carrying said shipper which it normally maintains in position to hold the belt upon the idler pulley, and a pivotally mounted latch-lever having one arm adapted to engage said shoulder of the shipper-lever when in position to hold the belt upon the driving pulley and another arm provided with an aperture through which passes a cord leading to the stitching mechanism and by abnormal variations in thickness of which the latch-lever may be shifted for disengagement from the shipper-lever to cause the automatic shifting of the belt upon the idler pulley.

3. A driving device for sewing machines comprising a driving and an idler pulley mounted for independent rotation upon a common axis and having conical faces inclined in the same direction relative to said axis, the faces of said pulleys being of substantially the same diameter at their adjacent edges and that of the driving pulley being the smaller of the two relative to the opposite edges, a belt adapted to connect said pulleys with a machine to be driven, a shipper for shifting the belt from one to the other of said pulleys, a self-acting lever provided with a detent shoulder and carrying said shipper which it normally maintains in position to hold the belt upon the idler pulley, and a pivotally mounted latch-lever having one arm adapted to engage said shoulder of the shipper-lever when in position to hold the belt upon the driving pulley and another arm provided with an aperture through which passes a cord leading to the stitching mechanism and by abnormal variations in thickness of which the latch-lever may be shifted for disengagement from the shipper-lever to cause the automatic shifting of the belt upon the idler pulley.

4. A driving device for sewing machines comprising a continuously running driving pulley and an adjacent normally stationary idler pulley, a driven pulley, a belt adapted to connect the driven pulley with the driving and idler pulleys, a shipper-lever adapted to automatically shift the belt from one to the other of said pulleys, a latch-lever directly engaging the shipper lever to hold the same in position to detain the belt upon one of said pulleys and adapted to engage a cord leading to the stitching-mechanism so that imperfections in the cord will impart a releasing movement to the said latch-lever, and means for insuring the reëngagement of the latch-lever with the shipper-lever when the latter is manually actuated.

5. A driving device for sewing machines comprising a hanger having a bearing boss, a driving shaft journaled in said hanger, a loose pulley journaled upon said bearing boss, a driving pulley fixed upon said shaft and having one edge of its face of substantially the same diameter as the adjacent edge of the loose pulley, a belt adapted to connect said pulleys with a machine to be driven, a self-acting belt shipper adapted to hold the belt normally upon the loose pulley, and a latch-lever for detaining said shipper against movement into normal position, said lever being adapted to receive a cord leading to the stitching mechanism and to be tripped by imperfections in said cord.

In testimony whereof, I have signed my name to this specification, in the presence of two subscribing witnesses.

HERBERT CORRALL.

Witnesses:
 HENRY J. MILLER,
 HENRY A. KORNEMANN, Jr.

Copies of this patent may be obtained for five cents each, by addressing the "Commissioner of Patents, Washington, D. C."